(12) United States Patent
Loreskar

(10) Patent No.: US 11,025,437 B2
(45) Date of Patent: **\*Jun. 1, 2021**

(54) POST-MANUFACTURE CERTIFICATE GENERATION

(71) Applicant: Trustonic Limited, Cambridge (GB)

(72) Inventor: Chris Loreskar, Cambridge (GB)

(73) Assignee: Trustonic Limited, Cambridge (GB)

( * ) Notice: Subject to any disclaimer, the term of this patent is extended or adjusted under 35 U.S.C. 154(b) by 214 days.

This patent is subject to a terminal disclaimer.

(21) Appl. No.: 16/114,556

(22) Filed: Aug. 28, 2018

(65) Prior Publication Data

US 2019/0074980 A1 Mar. 7, 2019

(30) Foreign Application Priority Data

Sep. 1, 2017 (GB) ..................................... 1714061

(51) Int. Cl.
*H04L 29/06* (2006.01)
*H04L 9/32* (2006.01)
*G06F 21/57* (2013.01)
*H04W 12/06* (2021.01)
(Continued)

(52) U.S. Cl.
CPC ............ *H04L 9/3265* (2013.01); *G06F 21/57* (2013.01); *H04L 9/006* (2013.01); *H04L 9/321* (2013.01); *H04L 9/3247* (2013.01); *H04L 63/0823* (2013.01); *H04W 12/06* (2013.01); *H04L 67/12* (2013.01)

(58) Field of Classification Search
CPC ..... G06F 21/57; H04L 63/0823; H04L 67/12; H04L 9/006; H04L 9/321; H04L 9/3247; H04L 9/3265; H04L 63/0272; H04L 63/168; H04L 9/3268; H04L 9/007; H04W 12/06

See application file for complete search history.

(56) References Cited

U.S. PATENT DOCUMENTS

| 9,087,012 | B1 | 7/2015 | Hayes | |
| 9,787,478 | B2 * | 10/2017 | Lee | ........................ H04L 9/3247 |
| 2006/0059333 | A1 | 3/2006 | Gentry | |

(Continued)

FOREIGN PATENT DOCUMENTS

WO 2008/057156 5/2008

OTHER PUBLICATIONS

U.S. Appl. No. 16/118,579, filed Aug. 31, 2018, Loreskar et al.
(Continued)

*Primary Examiner* — Hosuk Song
(74) *Attorney, Agent, or Firm* — Nixon & Vanderhye P.C.

(57) ABSTRACT

A method for post-manufacture certificate generation for an electronic device 4 comprises obtaining a public key from the electronic device 4, and enrolling the device in to a chain of trust provided by a public key infrastructure in which a child certificate is attested as valid by an attestor associated with a parent certificate in the chain. The enrolling comprises generating an electronic device certificate 30-I for the chain of trust using the public key 32 obtained from the electronic device. The enrolling is performed at an enrolment device 6 separate from the electronic device 4. The electronic device certificate 30-I is a descendant certificate of the enrolment device certificate 30-D associated with the enrolment device 6.

12 Claims, 4 Drawing Sheets

(51) Int. Cl.
*H04L 9/00* (2006.01)
*H04L 29/08* (2006.01)

(56) References Cited

U.S. PATENT DOCUMENTS

| | | |
|---|---|---|
| 2009/0031140 A1 | 1/2009 | Abdallah |
| 2010/0031025 A1* | 2/2010 | Zhang .................... H04L 63/20 713/156 |
| 2011/0029771 A1* | 2/2011 | Mehta ................ H04L 63/0823 713/156 |
| 2014/0040639 A1 | 2/2014 | Raam |
| 2014/0059278 A1 | 2/2014 | Schuh |
| 2015/0100720 A1 | 4/2015 | Flynn |
| 2016/0004877 A1 | 1/2016 | Hayes |
| 2016/0080338 A1* | 3/2016 | Wary .................... H04L 63/062 713/171 |
| 2016/0171439 A1 | 6/2016 | Ladden |
| 2017/0012783 A1* | 1/2017 | Moses ....................... H04L 9/14 |
| 2017/0132433 A1 | 5/2017 | Srinivasan et al. |
| 2017/0347223 A1 | 11/2017 | Robba |
| 2018/0007021 A1* | 1/2018 | Deriso ................ H04L 9/3242 |
| 2018/0034642 A1 | 2/2018 | Kaehler |
| 2018/0063123 A1* | 3/2018 | Tempel .................... G06F 21/44 |
| 2018/0159845 A1* | 6/2018 | Aronov ............... H04L 63/0435 |
| 2018/0198616 A1* | 7/2018 | Feather .................. H04L 9/321 |
| 2018/0198765 A1 | 7/2018 | Maybee |
| 2018/0248702 A1 | 8/2018 | Wu |
| 2018/0287802 A1 | 10/2018 | Brickell |
| 2019/0028281 A1 | 1/2019 | Turissini |
| 2019/0073152 A1 | 3/2019 | Nagle |
| 2019/0074981 A1* | 3/2019 | Loreskar ............... H04L 9/3265 |
| 2019/0272378 A1 | 9/2019 | Hirvimies |
| 2019/0340136 A1 | 11/2019 | Irwin |

OTHER PUBLICATIONS

Office Action dated Apr. 2, 2020 for U.S. Appl. No. 16/118,579, 17 pages.
Notice of Allowance dated Jul. 23, 2020 for U.S. Appl. No. 16/118,579, 10 pages.
Combined Search and Examination Report dated Feb. 6, 2018 in GB Application No. 1714064.1, 8 pages.
Extended European Search Report dated Nov. 7, 2018 in EP Application No. 18191657.8, 7 pages.

* cited by examiner

POST-MANUFACTURE CERTIFICATE GENERATION

This application claims priority to GB Patent Application No. 1714061.7 filed Sep. 1, 2017, the entire contents of which are hereby incorporated by reference.

The present application relates to the field of electronic devices. More particularly, it relates to providing a chain of trust according to a public key infrastructure.

Increasingly, electronic devices are being used to access services which may involve handling of potentially sensitive information, such as mobile banking, access to health care services or handling of employment details. Also, with the increasing development of the Internet of Things (IoT), it is becoming more common for systems such as heating, air-conditioning or street lighting to be controlled based on information provided by electronic devices which may provide sensor information such as temperature data or proximity information indicating whether a user is present, for example. In these scenarios, it can be important for a service provider to be able to verify that the electronic device meets certain requirements in order to trust that interaction with the electronic device is secure. The service provider may need to have confidence that the device has certain properties, e.g. that it was made by one of a group of trusted manufacturers, that it passed a certain quality assurance step, or that it has a certain hardware component or software application installed. Cryptographic techniques can be used to provide the required root of trust. For example a cryptographic key may be embedded in the device during manufacture and the device can later use that key to attest to an external verifier that the device has the properties expected by the verifier.

At least one example provides a method for post-manufacture certificate generation for an electronic device, the method comprising:
obtaining a public key from the electronic device; and
enrolling the electronic device into a chain of trust provided by a public key infrastructure, wherein in the chain of trust, a child certificate is attested as valid by an attestor associated with a parent certificate in the chain of trust, and the enrolling comprises generating an electronic device certificate for the chain of trust using the public key obtained from the electronic device;
wherein the enrolling is performed at an enrolment device separate from the electronic device; and
in said chain of trust, the electronic device certificate is a descendant certificate of an enrolment device certificate associated with the enrolment device.

At least one example provides an enrolment device comprising:
processing circuitry configured to:
obtain a public key from an electronic device, wherein the enrolment device is separate from the electronic device; and
enrol the electronic device into a chain of trust provided by a public key infrastructure, wherein in the chain of trust, a child certificate is attested as valid by an attestor associated with a parent certificate in the chain of trust, and the processing circuitry is configured to generate an electronic device certificate for the chain of trust using the public key obtained from the electronic device;
wherein in said chain of trust, the electronic device certificate is a descendant certificate of an enrolment device certificate associated with the enrolment device.

A computer program may be provided for controlling a data processing apparatus to perform the method discussed above. A storage medium may store the computer program. The storage medium may be a non-transitory computer storage medium.

Further aspects, features and advantages of the present technique will be apparent from the following description of examples, which is to be read in conjunction with the accompanying drawings, in which:

FIG. 1 schematically illustrates an example of a system comprising at least one electronic device and an enrolment device for enrolling the electronic devices in to a public key infrastructure;

Figure 1:
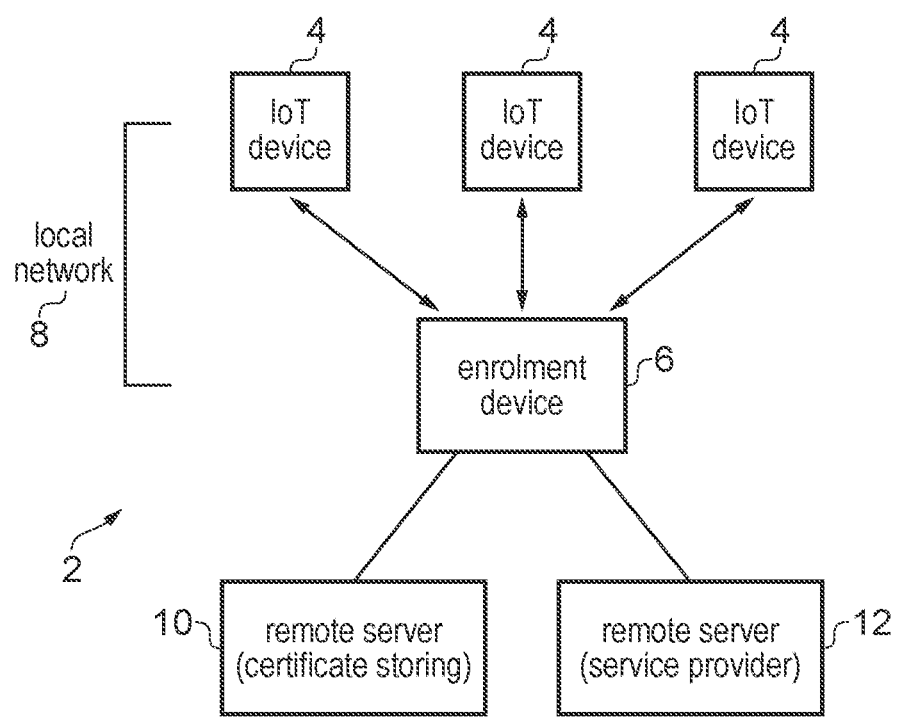

Certificates provided by a public key infrastructure (PKI) can be used to attest to properties of an electronic device, for example when the device is accessing a cloud service provided by a remote server. However, with the expansion of the internet of things, increasingly there is a class of devices which are extremely power- and area-constrained, and which may have particularly low storage capacity within the storage device. For example personal fitness monitor devices, sensors for sensing temperature or other ambient conditions, etc. may have has little as 16 or 32 kB of storage. Existing techniques for generating device certificates for enrolling the device in to a chain of trust provided by a public key infrastructure can be prohibitively expensive for this class of devices, because the device may have insufficient storage for storing not only the keys and certificates themselves, but also the software for securely controlling the generation of the keys and certificates and interaction with external servers, and the cost of adding additional storage purely for handling the PKI functionality may not be justified commercially. Also, generating the certificates during the manufacturing process may take too long a time to be cost effective, as the device certificate servers which are used on the manufacturing line may be too expensive, for example requiring hardware security modules (HSMs) which may be more expensive than justified for the relatively low cost, low power, devices.

These issues can be addressed by providing a method for post-manufacture certificate generation for an electronic device, in which a public key is obtained from the electronic device at an enrolment device which is separate from the electronic device, and the enrolment device performs the enrolling of the electronic device into a chain of trust provided by a public key infrastructure. In the chain of trust, a child certificate is attested as valid by an attestor associated with a parent certificate in the chain of trust. The enrolling performed by the enrolment device includes generating an electronic device certificate for the chain of trust using the public key obtained from the electronic device. In the chain of trust, the electronic device certificate is a descendant certificate of an enrolment device certificate associated with the enrolment device.

Hence, the process for enrolling the electronic device in to the chain of trust can be managed post-manufacture by a separate enrolment device, avoiding the need for the electronic device itself to store software for handling this process and avoiding the additional manufacturing cost of embedding the PKI keys/certificates in the device during manufacturing By enrolling the electronic device into the chain of trust as a descendant of the enrolment device certificate, rather than as a descendant of the certificate associated with a manufacturer or certifying authority, this enables the certificate to be generated when the electronic device is already in the field in the hands of an end user, for example, rather than requiring it to be done at the time of manufacture, thus reducing the cost of the manufacturing process and the device itself. Attestations provided by the electronic device based on the newly generated certificate can be validated by following the chain of trust through the enrolment device certificate back to the root certifying authority at the top of the chain of trust, so that verifiers can verify, if desired, how the certificate associated with the electronic device came to be established, in order to establish trust in the device.

The enrolment device may comprise a local device which communicates with the electronic device by direct communication or via a local area network. Hence, no remote network connectivity needs to be present in order to enrol the electronic device. For example the enrolment device could be a general purpose computer, laptop, tablet computer or mobile telephone within a home network, and the user of the enrolment device may enrol a number of smaller Internet of Things (IoT) type electronic devices within their home (such as healthcare or fitness monitors, temperature sensors, lighting controllers, etc.) into the public key infrastructure so that subsequent accesses to a remote service by those IoT devices can then be attested as valid. Nevertheless, while the present technique is particularly useful for smaller IoT-type devices (or small embedded IoT chips within a larger appliance such as a washing machine or refrigerator), it could also be used to enrol larger electronic devices such as general purpose computers, laptops, tablets or mobile telephones into a PKI.

In some cases, the electronic device certificate may be a direct child certificate of the enrolment device certificate. Hence, the electronic device certificate may be signed with a private key associated with the enrolment device, which a third party can verify as valid using the enrolment device certificate which may specify the corresponding public key.

Alternatively, the electronic device certificate could be a grandchild, great grandchild or further descendant certificate of the enrolment device certificate, so that there is at least one intermediate certificate between the electronic device certificate and enrolment device certificate within the chain of trust. For example, the electronic device certificate could be a child certificate of an application certificate associated with a specified application executed by the enrolment device, and the application certificate may be descendant certificate of the enrolment device certificate in the chain of trust. For example this can be useful for enabling third parties to verify that the electronic device certificate was created by a certain trusted application running on the enrolment device (with the presence/validity of the trusted application itself attested as valid by the application certificate).

The enrolling performed by the enrolment device may include uploading the device certificate to a remote certificate storing server. Hence, the enrolment device, which may have greater processing capacity and memory storage capacity than the electronic device itself, may manage the interaction with a remote server, to save resource at the electronic device. The generated electronic device certificate does not need to presented to, or stored at, the electronic device, but may merely be generated at the enrolment device and transmitted to the server. This saves storage at the electronic device. In general, the remote server may be a separate device from the enrolment device.

On the other hand, uploading the device certificate to a remote certificate storage server at the time of enrolment is not essential, and in other cases the certificate could simply be stored on the enrolment device. The transmission of the device certificate to other parties could instead happen later. For example when the electronic device actually wishes to access a remote server, the enrolment device could provide the electronic device certificate to the remote server (either on request from the electronic device, or on request from the remote server).

The enrolment of the electronic device could occur at different timings. In one example, a dedicated enrolment request may trigger the enrolment of the electronic device even if the device does not yet need to access a particular service provided by a third party. For example the enrolment could be part of the installation of software on the enrolment device associated with management of the electronic device. For example for a personal fitness monitor, the enrolment could be performed as part of the installation of corresponding software on the enrolment device for managing the personal fitness data.

Alternatively, the enrolment could be performed in response to a service access request from the electronic device to access a service provided by a remote server. Hence, the enrolment need not be performed pre-emptively, but could wait until the first time the electronic device becomes active and seeks to access a certain service which requires the electronic device to be able to attest to some properties of the device. At this time, the service access request may also trigger the enrolment device to handle the generation of the electronic device certificate as part of the enrolment.

In some examples at least an initial portion of communication performed in response to the service access request, the communication between the electronic device and the remote server may be performed via the enrolment device. In some examples, the electronic device may only have local network communication functionality but may not have remote network communication capability, and so all communication with the remote server may be via the enrolment device. Alternatively, the electronic device could have remote network communication capability, but may need network credentials or access permission from the remote server before it can communicate directly with the remote server. Hence, an initial portion of the communication between the electronic device and remote server may be performed via the enrolment device, but once a certain point in the access procedure has been reached (e.g. once the electronic device has been validated as genuine by the server and the electronic device has received the network credentials), then subsequent communication could be performed directly with the remote server, bypassing the enrolment device. In other examples, the enrolment device could communicate directly with the remote server once its electronic device certificate has been established.

The electronic device certificate may comprise metadata indicative of the circumstances in which the electronic device certificate was generated. For example, the metadata could include at least one of: a user identifier identifying a user of the electronic device or the enrolment device associated with generation of the electronic device certificate; an indication of a geographic location of the electronic device or the enrolment device when the electronic device certificate was generated; and a date or time of generation of the electronic device certificate. Of course, the certificate may also include any other relevant metadata that bear an importance to reside in the generated electronic device certificate.

By generating some metadata indicating circumstances in which the electronic device certificate was generated, this can enable third parties to make more considered decisions on whether an attestation from a given electronic device is to be accepted or not. For example, certificates generated more than a certain time ago, or when the device was outside a given geographic area, could be rejected even if they would otherwise be valid.

In some examples, the enrolling of the electronic device may be performed on condition that validation of the electronic device is successful. Validation can be based on secret information held by the electronic device or associated in some way with the electronic device. For example, the enrolment device may obtain a device identifier or key from the device and verify (e.g. by checking against a device database held by a server) that the device identifier/key corresponds to a valid device, before proceeding with enrolment of the electronic device into the PKI. This can be useful, for example, for preventing a malicious entity attempting to enrol a non-existing device by running the enrolment procedure with some arbitrary device identifier and public key which does not correspond to a valid device.

In some examples, the validation of the electronic device could be based on a single device key.

In another example, the validation could comprise checking whether a pairing between a first identifier and second identifier associated with the first electronic device is one of a set of valid pairings associated with a known set of devices. The first identifier may be accessible from storage circuitry of the electronic device by a predetermined process executed by the electronic device, while the second device identifier may be inaccessible from the storage circuitry by that predetermined process. For example, while the first device identifier could be stored within memory of the device, the second device identifier can be encoded in markings printed on part of the device (e.g. on the casing, an internal component such as a SIM card or battery, or on a sticker stuck on the device), or could be represented on other material accompanying the device (e.g. an instruction manual or packaging), so that the second device identifier cannot be read by the processing circuitry within the electronic device itself. The enrolment device could for example read the second identifier by scanning a barcode or QR code or other graphic representation of the second identifier. The valid pairings of first/second identifiers may be recorded in a database held by a remote server, so that when validating the device the enrolment device can obtain the first and second identifiers and check whether the device is valid using the database. This approach can be useful for preventing malicious parties enrolling devices which they do not have in their physical possession by guessing a identifier value, since even if they can guess the first identifier they may not be able to guess the valid pairing with the second identifier, and even if an attacker visits a shop to scan the second identifier for devices they do not own, it is unlikely they would also be able to boot the device to read the first identifier as well.

The electronic device certificate can have a range of formats (e.g. a bespoke proprietary certificate format). However, in one example the electronic device certificate may comprise an X.509 certificate. X.509 provides a de facto standard for certificate generation. Hence, an industry standard format can be used rather than needing to provide proprietary solutions, which increases compatibility with external third party verifiers relying on the attestations provided by the device, who can process the certificates in a similar way to certificates associated with other devices.

FIG. 1 schematically illustrates an example of a system 2 comprising a number of electronic devices 4 and an enrolment device 6 which communicate within a local network 8. The electronic devices 4 may be Internet of Things (IoT) type devices, for example. The enrolment device 6 may be a general purpose computer, such a personal computer, laptop, mobile telephone or tablet computer for example. The IoT devices 4 may communicate with the enrolment device 6 by any of a number of protocols, such as WiFi®, Bluetooth®, Zigbee®, NFC, etc. The enrolment device 6 may also be in communication with various remote servers 10, 12, such as a certificate storing server 10 for storing certificates associated with a public key infrastructure, or a service provider server 12 associated with some cloud service, such as a banking or health care service. Although not shown in FIG. 1, in some examples the IoT devices 4 could also communicate with the remote servers 10, 12 directly. Alternatively, the IoT devices 4 could only have local communication functionality, and communication with the remote servers could be performed via the enrolment device 6.

Figure 2:
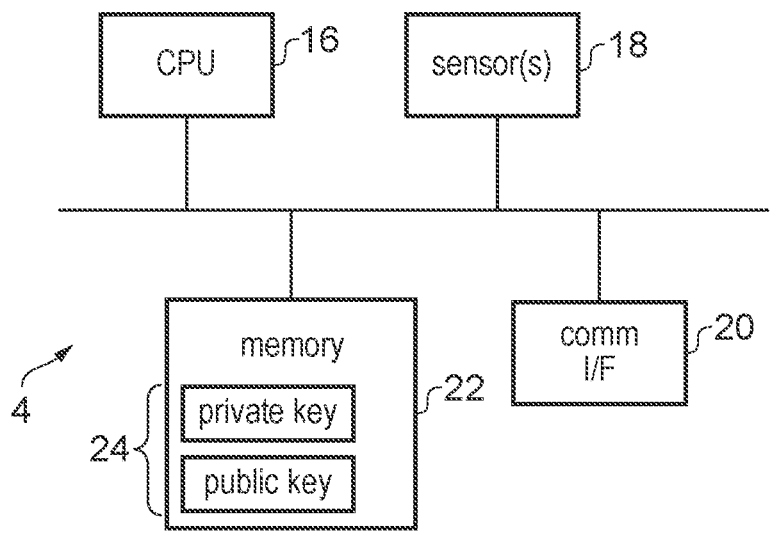
FIG. 2 shows an example of the electronic device.

FIG. 2 shows an example of components of an electronic device (IoT) device 4, which may include processing circuitry (e.g. a CPU) 16, one or more sensors for a sensing parameter such as temperature, heart rate, air pressure, or any other condition, and communication circuitry 20 for communicating with external devices such as the enrolment device 6. The IoT device 4 may also have memory storage 22 which may be used for storing data, programs to be executed by the CPU 16, and keys 24 which can be used by the device to identify itself to other devices. For example the keys 24 may include a private key-public key pair which may be formed according to RSA or elliptic curve cryptographic methods. The key pair could be imprinted in the IoT device for during manufacturing, or during a post production step.

Figure 3:
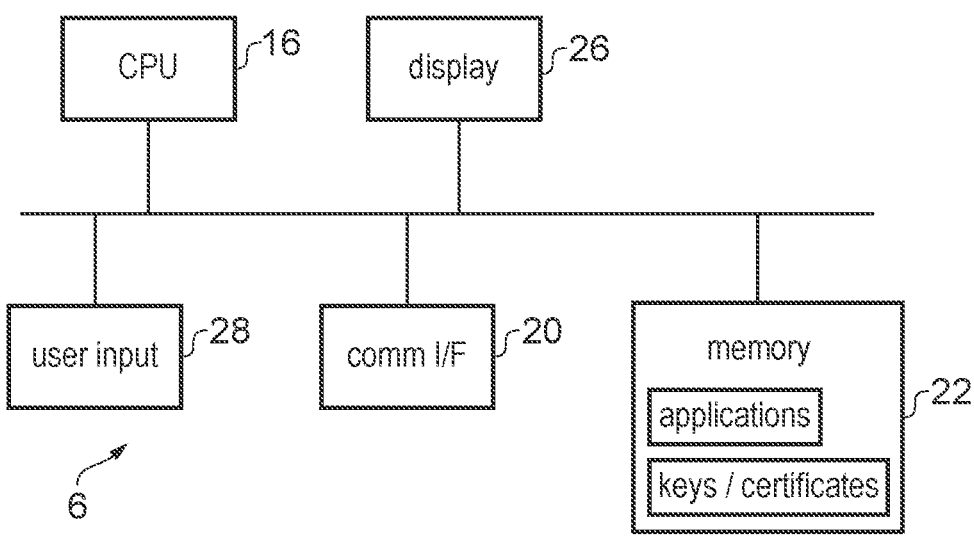
FIG. 3 shows an example of the enrolment device.

As shown in FIG. 3, the enrolment device 6 may include processing circuitry 16, a communications interface 20 and memory 22, but could also include additional elements such as a display 26 for displaying information to user and user input interface 28 for receiving user input from the user. Compared to the IoT device 4, the processing circuitry 16 may be more powerful (capable of executing at a higher frequency and/or instruction throughput) than the processing circuitry 16 in the IoT device 4. Similarly, the capacity of the memory 22 in the enrolment device 6 may be greater than the memory 22 in the IoT device 4.

While FIGS. 2 and 3 show particular examples of an architecture for the IoT device 4 and enrolment device 6, it will be appreciated that these are just examples than many other components could also be provided. For example, some IoT devices could also have a display 26 and/or user input interface 28.

Figure 4:
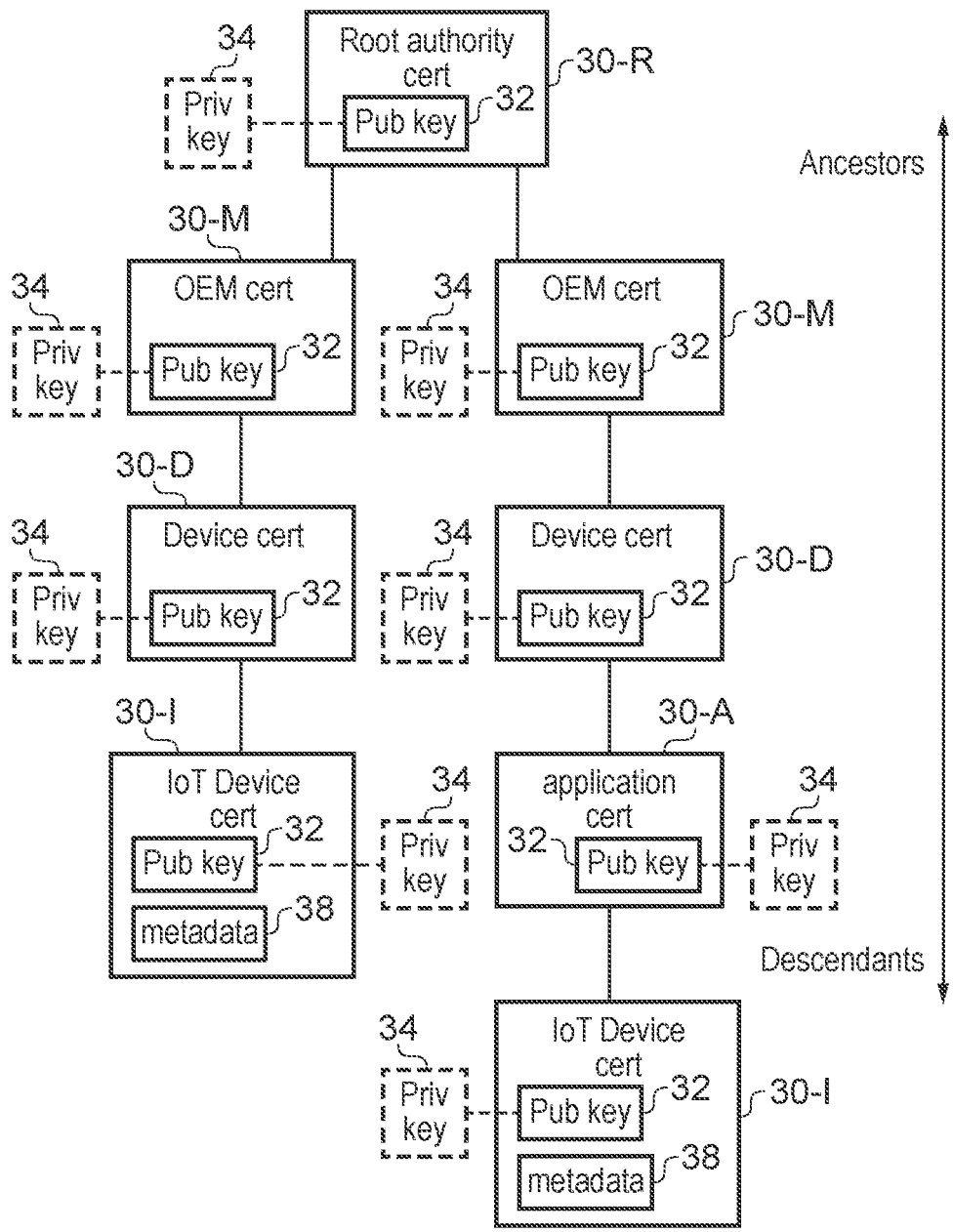
FIG. 4 shows an example of certificates in a chain of trust provided by a public key infrastructure.

FIG. 4 shows an example of a chain of trust provided by a public key infrastructure. The public key infrastructure is represented by a hierarchy of certificates 30 which can be used for verifying the source of messages. Each certificate 30 comprises a public key 32 which corresponds to a private key 34 held by the corresponding source to be attributed. For example, the private-public key pair could be a key-pair created according to RSA techniques or through elliptic curve cryptography. Trust in the chain of trust ultimately derives from a root certifying authority which is associated with a root certificate 30-R. The root certifying authority associated with the root certificate 30-R may attest as valid a number of child certificates 30-M, for example corresponding to particular manufacturers of electronic devices (OEMs). Each OEM may then certify as valid particular electronic devices who may have their own certificates 30-D generated as children of the OEM certificates within the chain of trust. Hence, the chain of trust provides a tree of certificates, where a child certificate is attested as valid by an attestor associated with a parent certificate in the chain of trust. As the certificates are generated in successive generations, then when a particular certificate is determined to be valid, it can be implied that there was a chain of trust extending all the way back to the root certifying authority, giving confidence in the authenticity of the source of messages, but with the delegated attestation provided by the chain avoiding the complexity of a single certifying authority having to directly attest to the validity of each device or source of messages itself. While FIG. 2 shows a particular hierarchy where an OEM creates device certificates for its manufactured devices directly, in other examples there may be multiple levels of manufacturer certificate between the root certificate 30-R and a device certificate 30-D. In addition to the public key 32, the certificates may include other information associated with the corresponding source of messages being authenticated. The certificates could have any format, but in one particular example may be defined according to the X.509 standard.

The present technique extends the chain of trust so that a certificate 30-I for an IoT device 4 is created as a descendant of a device certificate 30-D associated with an enrolment device 6 which manages to the enrolment processes for enrolling the IoT device in to the chain of trust. This contrasts with techniques which register the IoT device directly under the manufacturer certificate 30-M or the certificate 30-R associated with a certifying authority. By using this approach, the generation of the certificate can be managed using an enrolment device 6 which has greater resource than the IoT device 4, and also the manufacturing process for manufacturing the IoT devices can be faster and hence more cost effective.

As shown in FIG. 4, for some devices the IoT device certificate 30-I may be created directly under the enrolment device certificate 30-D as a direct child in the tree of trust. On the other hand, for other examples the IoT device certificate 30-I may not be a direct child, but could be a further descendant of the device certificate 30-D. For example, an application certificate 30-A for attesting to the presence/validity of a particular software application installed on the enrolment device 6 may be generated as a child of the enrolment device certificate 30-D, and the IoT device certificate 30-I may be generated as a child of the application certificate 30-A. For example the application corresponding to the application certificate which acts as a parent of the IoT device certificate may be the trusted application which is responsible for managing the enrolment process.

The public key 32 and private key 34 associated with the IoT device certificate 30-I could be pre-existing keys 24 which were injected into the device during manufacture, or could be keys which have been provided to the device or generated within the device subsequently during a post processing step. In addition to the public key 32, the IoT device certificate 30-I may include metadata 38 which may indicate other information about the way in which the IoT device certificate was generated. For example the metadata could specify the time at which the IoT certificate was generated, the geographic location at which the enrolment device 6 and/or the IoT device 4 was located at the time of generation of the certificate (e.g. sensed using a GPS sensor of the enrolment device 6), or could indicate a user identifier identifying a user of the electronic device or the enrolment device which is associated with generation of the electronic device certificate. Clearly, other types of metadata can also be indicated. This metadata can be useful for enabling a third party verifier to identify how the IoT device certificate was created.

Figure 5:
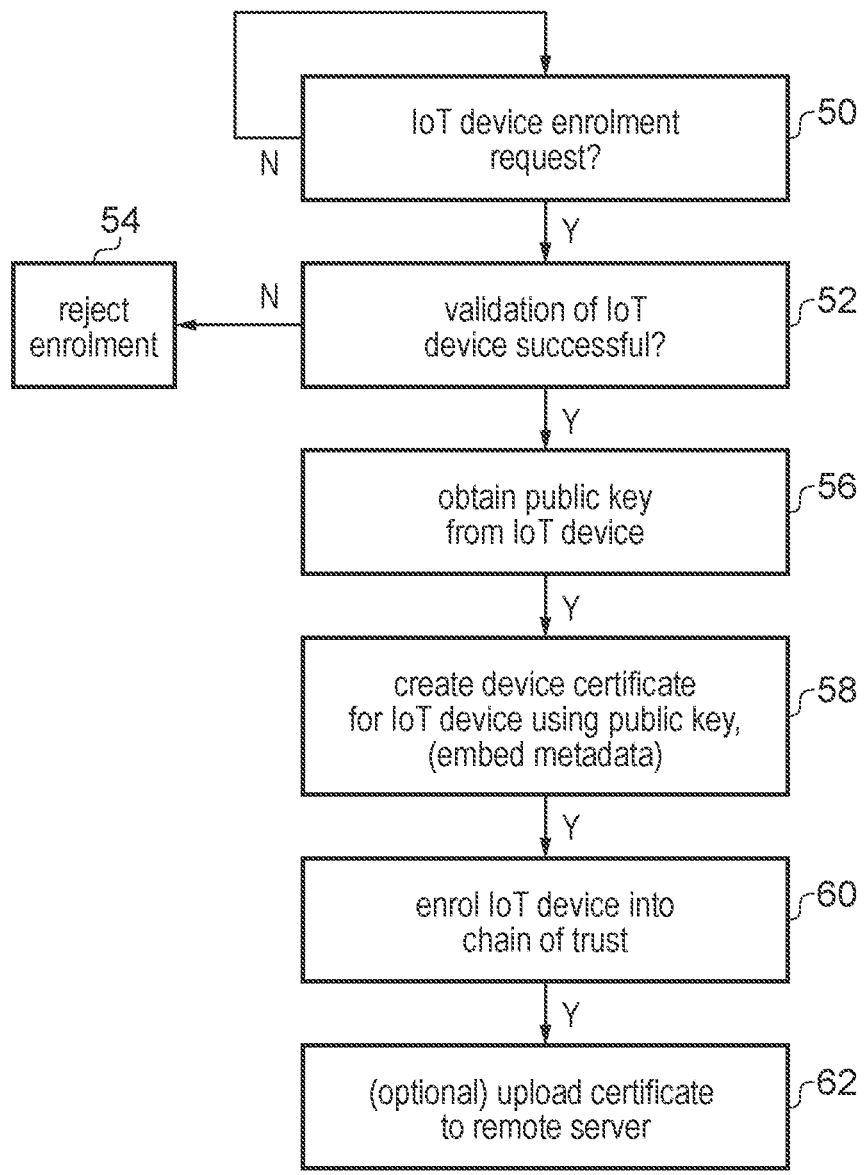
FIG. 5 is a flow diagram illustrating a method of enrolling an electronic device in to a public key infrastructure.

FIG. 5 shows a flow diagram illustrating a method of enrolling the IoT device 4 into a public key infrastructure. At step 50 the enrolment device 6 determines whether a device enrolment request has been received. For example the enrolment request could be triggered by the IoT device 4 or by the enrolment device 6, and could be generated during installation of software associated with the IoT device, or on a request for access to a third party service by the device 4 when the device 4 has not previously already been enrolled into the PKI, or at some other arbitrary timing. When a device enrolment request is received from a given IoT device, then at step 52 the enrolment device 6 may perform validation of the IoT device, for example based on one or more identifiers obtained from the IoT device 4, which can be verified against a database of authorised devices provided by a third party for example. If validation is unsuccessful then at step 54 the enrolment may be rejected.

If the device is valid then at step 56 a public key is obtained from the IoT device 4 (e.g. by generating a new private-public key pair within the IoT device 4 or by reading a public key of a private-public key pair previously injected into the device 4 or previously generated within the device 4). At step 58 the enrolment device 6 creates a device certificate for the IoT device using the public key, and embeds other metadata associated with the device or the certificate generation in the certificate, such as the IoT device identifier, user identifier, time of generation, etc. The certificate may be defined according to a certain format such as X.509, and could specify a date range or time range in which the certificate is valid and other policy information associated with the validity of the certificate. At step 60 the device certificate is enrolled into the chain of trust. The electronic device certificate for the IoT device 4 is generated as a descendant of the enrolment device certificate associated with the enrolment device 6 itself. For example if the IoT device certificate is a direct child of the enrolment device certificate then the IoT device certificate can be signed using the private key of the enrolment device 6 so that other parties can verify that the IoT device certificate is valid. Alternatively, the IoT device certificate may be generated as a child or a further descendant of the enrolment device certificate, e.g. as a child of a trusted application certificate associated with a particular application executed by the enrolment device 6, signed with a private key associated with the application. Either way, the electronic device certificate for the IoT device 4 may specify an issuer identifier identifying the parent which issued the certificate (which could be the enrolment device 6 or a trusted application), so that a verifier can verify the signature on the IoT device certificate by obtaining the corresponding parent certificate. At step 62, optionally the generated device certificate may be uploaded to a remote certificate storing server, although this is not essential as the certificate could also be provided to verifiers along with signed messages from the IoT device 4.

In summary, a system is provided to distribute the creation of a device certificate for IoT devices (for attestation purposes) to a signing entity (enrolment device 6) which itself has no direct access to the PKI keys held in HSMs, but belongs to the same PKI and can still enrol new devices into said PKI. The technique can be applied to non-IoT devices but for ease of explanation will be discussed in the context of IoT devices below.

IoT devices are a heterogeneous collection of different entities. They vary in persistent storage capacity, processing capabilities, connectivity, power, etc., etc. For a remote entity to establish a trust relationship with an IoT device, device attestation can be used—but this only works if the device can present something that the remote entity trusts. One example of this is device certificates, but for IoT devices there might be no key in a remote device directory (or equivalent) which could be used for device attestation. Furthermore, generating certificates for each device might take too long time during manufacturing (or some factory setups may not support certificate generation) or it is too expensive to have device certificate servers injecting keys in the factory (may typically requires a hardware security module (HSM), but these are expensive, so not always an option).

With the technique discussed here, this allows an IoT device certificate to be created after manufacturing time. The IoT device certificate is signed into a PKI by the enrolment device, but without the enrolling device requiring a network connection, nor requiring access to a PKI HSM where the keys related to said PKI exist. The IoT device lacks all means to produce the certificate. The IoT device is signed into the same PKI as the enrolment device itself.

A particular embodiment is described below. It will be appreciated that the invention is not limited to this embodiment.

The IoT device is imprinted with a key (either during manufacturing time, or post-production). For example, the IoT device may employ an ECC (elliptic curve cryptography) key pair, and the device may retain the private part and the public one needs to be in a certificate for device attestation purposes. The IoT device will not create a certificate signing request and send it to a certifying authority to create a certificate (nor will a HSM inject/create one), instead it will establish a connection with an enrolment device, running a trusted execution environment for example, and present the relevant information needed that should be inserted into this certificate, like the device identifier, the public key and so forth.

The enrolment device then creates a certificate and embeds the public key of the IoT device, the device identifier, the date ranges etc., etc. as required by the policies associated with the certificate format, and finally signs the IoT device certificate. The enrolment device already has a device key which it uses to create trusted application specific certificates so in this case, the Trusted Application that enrolled the IoT device would already initially have requested for the creation of the IoT device certificate. Following that, the trusted application would also enrol the IoT device into the same chain.

For example, the hierarchy of certificates could be as follows:

Root->OEM->Device—This is the typical chain

Root->OEM->Device->TA Certificate—This is the chain with a trusted application specific device certificate (to attest a specific trusted application on a specific device). The trusted application that enrolls the IoT device, requests for the creation of this.

Root->OEM->Device->TA Certificate->IoT device—This is the chain with the IoT device now enrolled, i.e. the trusted application Certificate becomes the issuing (parent) certificate of the newly created IoT device certificate.

The idea to utilize the enrolment device to sign the IoT device into a chain has several benefits:

No need to contact a server for the certificate creation—it can all be done locally. Can thus be used to create attestation without network connectivity present (e.g. for local trust usages, or in a local network if so required—like device to device).

By signing the IoT device into the same chain as the enrolment device, the chain is extended to also include IoT devices—all tied up to the root of the chain of trust. This is valuable as attestation is all in the same chain (and also provides a PKI attested audit log).

By using standard X.509 certificates, industry standard solutions can be used to validate attestations from the IoT device without the need to create new proprietary ones.

By using the enrolment device for all certificate creation, the IoT device can remain simpler and cheaper to produce, yet benefit from the strength the industry standard PKI yields (for attestation purposes).

Fraudulent Enrolment Protection

The following section explains how the enrolment device 6 could, at some point in time, validate a device before creating its required certificate. This approach is not mandatory and merely serves as an example to solve a particular issue. To prevent malicious entities enrolling devices which they lack genuine ownership of, (because say the device identifiers of the IoT devices are predictable), or if a legitimate user did enrol their device, but the attacker tries to re-enrol it later and so fraudulently take "ownership" of said IoT devices, one approach could be as described below.

When the IoT device is created, a salt (second identifier) for each device is also generated. There is no mathematical or otherwise "known" correlation between this salt and the device's identifier (first identifier), to prevent an attacker reverse engineering the relationship and breaking the security. The salt should be sufficiently large and uniformly random. In the factory where the device is created, a device identifier and a random number are associated with the device during manufacturing, and also a copy of the same is retained in a database for each device. The salt is not secret in any way, and does not need to be treated in such way either. It could be written to a fuse bank if available, or could be put on a sticker of the product, but is not stored in the software/hardware of the device itself. If it was never accessible on the device itself, but accessible say through a QR code or similar, during the enrolment phase, this salt could be picked up by an enrolment application running on the enrolment device 6, that helps enrol and validate if the device really is genuine or not before attempting to create a device certificate as well. During the enrolment, an enrolment server (remote from the enrolment device 6) can validate that the pairing of the device ID and salt matches its records, and if valid then allow the enrolment device 6 to create an IoT device certificate. An attacker attempting to enrol devices would be unsuccessful in guessing the salt for the device he/she is trying to claim ownership of and subsequently fail.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method for post-manufacture certificate generation for an electronic device, the method comprising:
    obtaining one or more identifiers from the electronic device;
    validating the electronic device by an enrollment device based on the one or more identifiers;
    when validation of the electronic device by the enrollment device is successful:
        obtaining a public key from the electronic device; and
        enrolling the electronic device into a chain of trust provided by a public key infrastructure, wherein in the chain of trust, a child certificate is attested as valid by an attestant associated with a parent certificate in the chain of trust, and the enrolling comprises generating an electronic device certificate for the chain of trust using the public key obtained from the electronic device;
    wherein the enrolling is performed by the enrollment device, the enrollment device being separate from the electronic device; and
    in said chain of trust, the electronic device certificate is a descendant certificate of an enrollment device certificate associated with the enrollment device.

2. The method of claim 1, wherein the enrollment device comprises a local device communicating with the electronic device by direct communication or via a local area network.

3. The method of claim 1, wherein the electronic device certificate is a child certificate of the enrollment device certificate.

4. The method of claim 1, wherein the electronic device certificate is a child certificate of an application certificate associated with a specified application executed by the enrollment device, and the application certificate is a descendant certificate of the enrollment device certificate in the chain of trust.

5. The method of claim 1, wherein the enrolling comprises uploading the electronic device certificate to a remote certificate storing server.

6. The method of claim 1, wherein the enrolling is performed in response to a service access request from the electronic device to access a service provided by a remote server.

7. The method of claim 6, wherein for at least an initial portion of communication performed in response to the service access request, communication between the electronic device and the remote server is performed via the enrollment device.

8. The method of claim 1, wherein the electronic device certificate comprises metadata indicative of the circumstances in which the electronic device certificate was generated.

9. The method of claim 8, wherein the metadata specifies at least one of:
    a user identifier identifying a user of the electronic device or the enrollment device associated with generation of the electronic device certificate;
    an indication of a geographic location of the electronic device or the enrollment device when the electronic device certificate was generated; and
    a date or time of generation of the electronic device certificate.

10. The method of claim 1, wherein the electronic device certificate comprises an X.509 certificate.

11. A non-transitory, computer-readable storage medium storing a computer program for controlling a data processing apparatus to perform the method of claim 1.

12. An enrollment device comprising:
    a memory, and
    processing circuitry configured to communicate with the memory and to:
        obtain one or more identifiers from an electronic device;
        validate the electronic device based on the one or more identifiers;
        when validation of the electronic device by the enrollment device is successful:
            obtain a public key from an electronic device, wherein the enrollment device is separate from the electronic device; and
            enrol the electronic device into a chain of trust provided by a public key infrastructure, wherein in the chain of trust, a child certificate is attested as valid by an attestant associated with a parent certificate in the chain of trust, and the processing circuitry is configured to generate an electronic device certificate for the chain of trust using the public key obtained from the electronic device; and
    wherein in said chain of trust, the electronic device certificate is a descendant certificate of an enrollment device certificate associated with the enrollment device.

* * * * *